US006739718B1

(12) United States Patent
Jung

(10) Patent No.: US 6,739,718 B1
(45) Date of Patent: May 25, 2004

(54) VISOR SUNGLASSES

(76) Inventor: Man-Young Jung, 2750 Washington Blvd., Suite 150, Pasadena, CA (US) 91107

( * ) Notice: Subject to any disclaimer, the term of this patent is extended or adjusted under 35 U.S.C. 154(b) by 0 days.

(21) Appl. No.: 10/463,928

(22) Filed: Jun. 18, 2003

(51) Int. Cl.[7] .................................................. G02C 3/00
(52) U.S. Cl. ........................................... 351/155; 2/10
(58) Field of Search ................................ 351/154, 155, 351/156; 2/10

(56) References Cited

U.S. PATENT DOCUMENTS

| | | | |
|---|---|---|---|
| 4,850,049 A | * 7/1989 | Landis et al. .................... 2/10 |
| 5,197,150 A | * 3/1993 | Bedient ......................... 2/195 |
| 5,491,841 A | * 2/1996 | Valletta ........................... 2/10 |
| 5,533,208 A | * 7/1996 | Tonoyan et al. .................. 2/10 |
| 5,581,807 A | * 12/1996 | Peterson .......................... 2/10 |
| 5,930,834 A | * 8/1999 | Toovey ............................ 2/10 |
| 6,662,371 B2 | * 12/2003 | Shin ................................ 2/10 |

* cited by examiner

Primary Examiner—Huy Mai
(74) Attorney, Agent, or Firm—Clement Cheng

(57) ABSTRACT

A visor sunglasses device comprising: a cap member, a visor member with a pocket and a connector having a pair of connector slots. The connector is rigidly affixed to the underside of the rigid planar member and hidden inside the pocket of the visor. The visor has a fabric opening allowing access of connector tabs to connectors slots. The sunglasses are semi flexible plastic material and bend to fit into the visor. A pair of connector tabs integrally formed on the sunglass member disconnectably connect to the pair of connector slots.

12 Claims, 4 Drawing Sheets

VISOR SUNGLASSES

DISCUSSION OF RELATED ART

Over the past 90 years, several methods of attaching sun-shielding eyewear to hat wear have been patented. These different methods have been influenced by ever-changing fashions and consumer demands.

In 1916, in U.S. Pat. No. 1,182,784 by Baker, the idea of connecting an eye shield to a cap is shown in its early stages. In this patent, side clips are used to connect the shield to a cap that is of the style worn during the early 20$^{th}$ Century.

In 1929, Inventor Prichard in U.S. Pat. No. 1,829,538 demonstrated an early method for connecting an eyeglass shade to a golf cap using clips. The object was both to enhance a golf player's ability to keep their head still and to minimize distractions from a golfer's lateral vision. The style of the golf cap is consistent with those worn in the late 1920's.

By 1951, Inventor Vaca in U.S. Pat. No. 2,619,641 provided a more complex attachment mechanism for connecting sunglasses to a baseball style cap. The user now could adjust the glasses from a state of use to non-use as the glasses were both pivotally and slidably adjustable.

Since Vaca's invention, others have improved upon his mechanism and have changed the apparatus to conform to changing fashions. In U.S. Pat. No. 4,819,274 by Day (1989), a mounting block for holding sunglasses, connected to a visor cap, is shown. A dovetail grove is detailed which allows the user to adjust the eye shield backwards and forwards. This mechanism improved upon the adjustability of the eye shield and was adapted to the open visors that became popular in the 1980s. Other recent mechanisms for attaching eyewear to open visors also include U.S. Pat. No. 5,335,025 by Wang (1994) and U.S. Pat. No. 5,519,460 by Mills (1996). Wang describes a mechanism for connecting eyewear to a visor using flexigrip-catch pairs. Mills describes a visor including earpieces upon which eyewear can be attached.

Inventor Day in U.S. Pat. No. 5,261,124 (1993), provided a mechanism which did not require any special groove or other attachments, unlike his previous invention in 1989. A clip with a slide block is described which attaches to the center of the cap visor. The eye shield contains a support which attaches to the slide block, allowing the eye shield to be pivotally and slidably adjusted.

In U.S. Pat. No. 5,208,916 (1993), Inventor Kelman provided a mechanism of having two parallel rails on the visor of a cap upon which a sun shield could be attached. In 1995, in U.S. Pat. No. 5,422,686, Kelman provided another mechanism in which sunglasses were attached to a single horizontal rail on the cap visor.

Further variations were developed throughout the mid to late 1990s. In 1995, A clip-on sunglasses assembly was described in U.S. Pat. No. 5,471,259 by Cahill. In 1996, a flexible sunglass film attached to a hat using Velcro was described in U.S. Pat. No. 5,491,841 by Valetta. In 1999, in U.S. Pat. No. 5,987,640 by Ryder, a new mechanism for adjusting an eye-shield from Use to a Rest Position underneath the visor of the cap is shown. In 2001, Inventor Maher in U.S. Pat. No. 6,244,706, provided a mechanism that similarly allowed the user to flip sunglasses from a use to rest position, but also made the mechanism detachable from the visor of the cap.

What is desired, is a means for preventing breaking of delicate parts and loss of small parts, especially when the device is placed in a washing machine.

SUMMARY OF THE INVENTION

A visor sunglasses device comprising: a cap member, a visor member with a pocket and a connector having a pair of connector slots. The connector is rigidly affixed to the underside of the rigid planar member and hidden inside the pocket of the visor. The visor has a fabric opening allowing access of connector tabs to connectors slots. The sunglasses are semi flexible plastic material and bend to fit into the visor. A pair of connector tabs integrally formed on the sunglass member disconnectably connect to the pair of connector slots.

DETAILED DESCRIPTION

Figure 1:
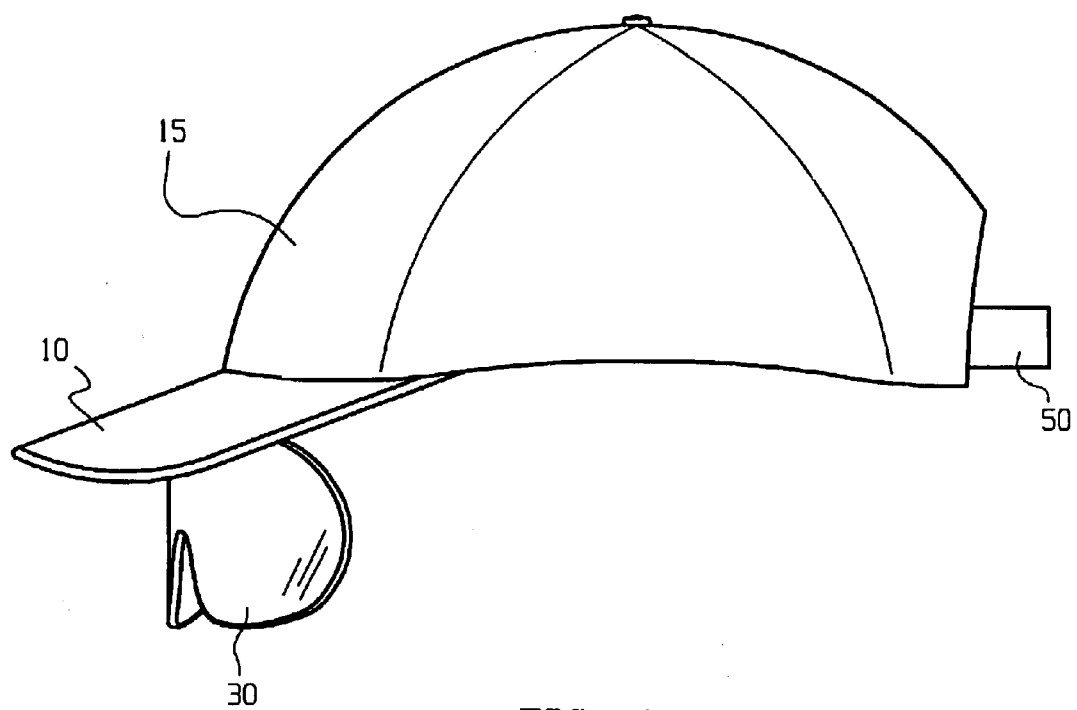
FIG. 1 is a side view of the device.

FIG. 1 shows the side-view of the configuration of the Visor Sunglasses. The Visor 10 is attached to the cap 15 and contains a mechanism for attaching sunglasses. The side view shows that the sunglasses portion is fixed at an approximately perpendicular angle to the visor. The cap 15 contains a strap 50 that is adjustable to the head size of the wearer.

The visor attaches to the cap normally because the visor is integrally formed as a part of the cap. Most visors and caps are made of fabric material. The visor in a baseball cap traditionally contains a rigid planar structure having a fabric outer layer. The outer fabric is stitched to the rigid structure and is retained to the structure. The visor in the present invention forms a pocket for holding the sunglasses member. The sunglasses member is made of semi flexible plastic and conforms to the pocket in the visor. The visor often has a convex shape and is not a flattened shape. The shape of the visor depends upon the shape of a person's head, which is roughly spherical and may receive a cap as head wear.

Figure 2:
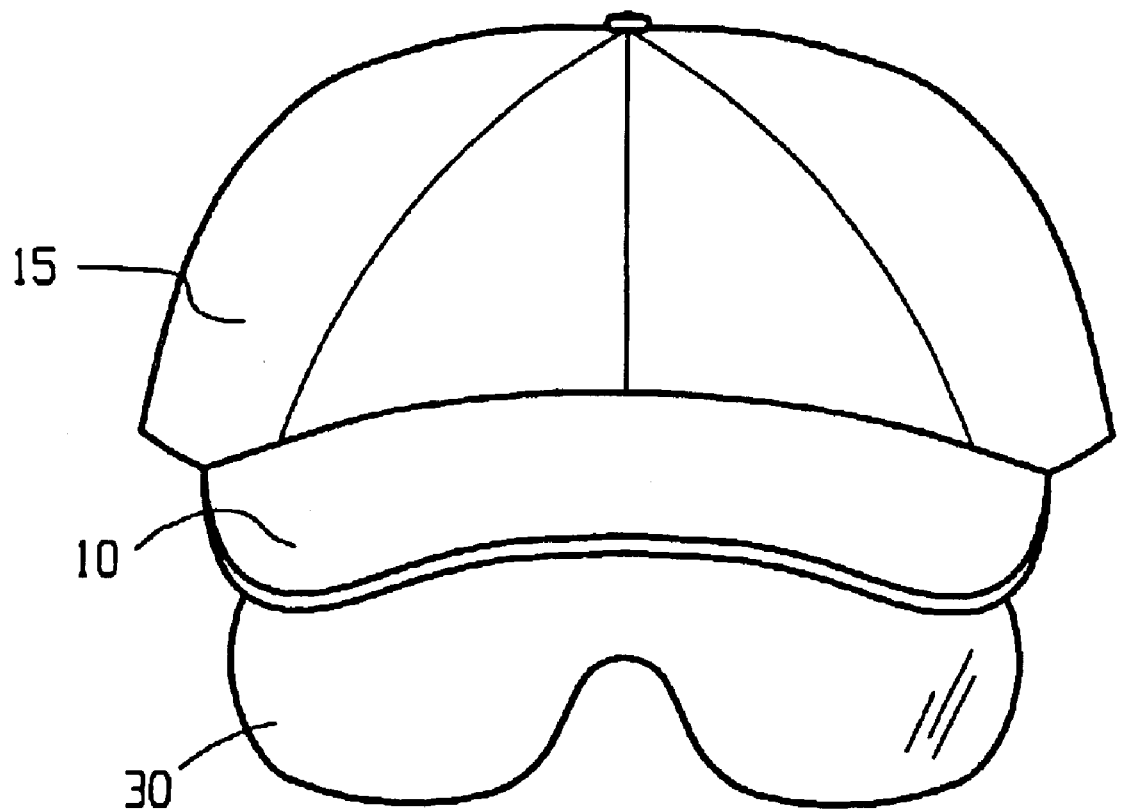
FIG. 2 is a front view of the device.

FIG. 2 shows a frontal view of the same configuration shown in FIG. 1. The cap 15 attached to the visor 10 to which the sunglasses 30 are attached. The shape of the sunglasses 30 allows the glasses to fit comfortably over the wearer's nose and shield the wearer's eyes from the sun.

Figure 3:
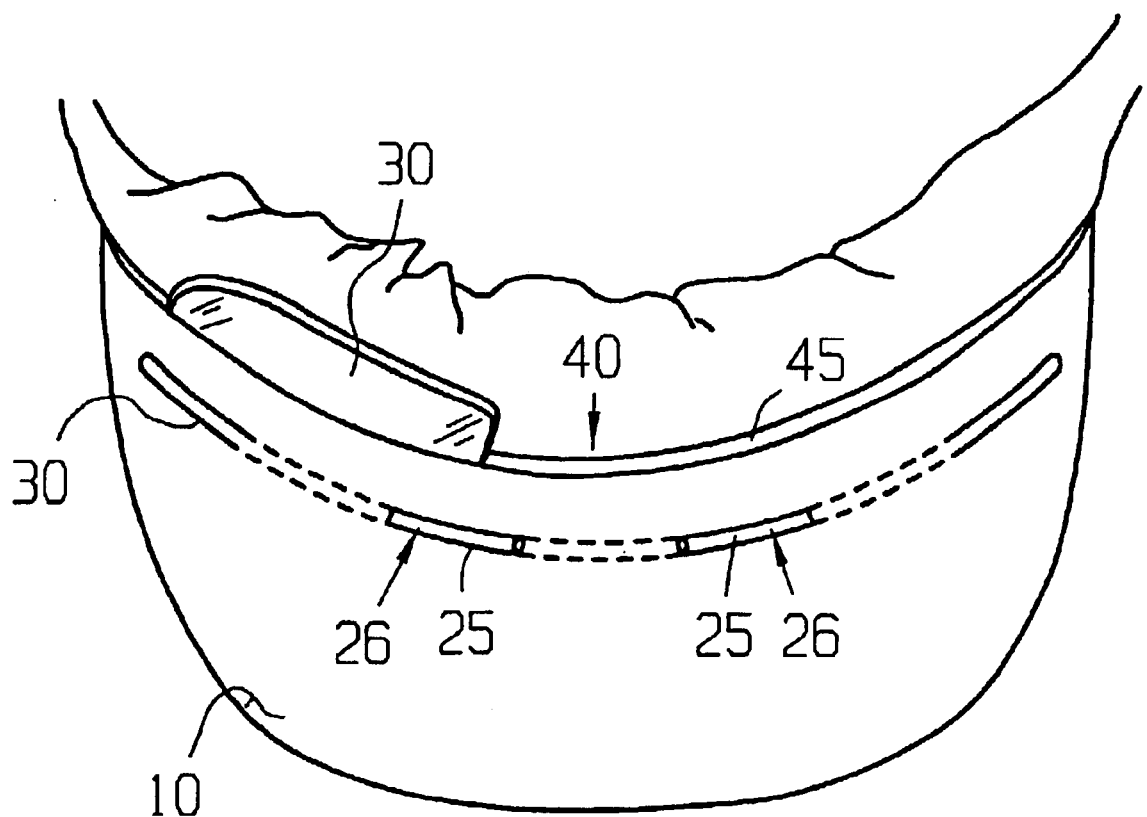
FIG. 3 is a bottom view of the device having the sunglasses in semi stowed position.

FIG. 3 shows the mechanism for attaching the sunglasses to the underside of the visor 10. At the center of the underside of the visor two openings in fabric 26 show connector slots where the sunglasses are attached. The mechanism is also shown for transferring the sunglasses from a state of use to non-use. A pocket opening 45 leading to a pocket 40 is shown where the sunglasses 30 can be stored when not being used. The pocket opening in the visor is parallel to the visor such that the sunglasses lay flat against the visor. The pocket opening is parallel to a person's forehead and parallel to the interface between the visor and the cap. Because of the pocket openings location, a user must remove the device before manually removing the sunglass member from the pocket.

The sunglasses fit completely inside the pocket. The sunglass member fits into the pocket completely so that a casual observer would not notice the difference between the present invention, and an ordinary baseball cap having a visor. The cap portion of the device may be open to the air so that a person wears the visor and the cap while receiving an air flow and sunlight to the person's head.

Figure 4:
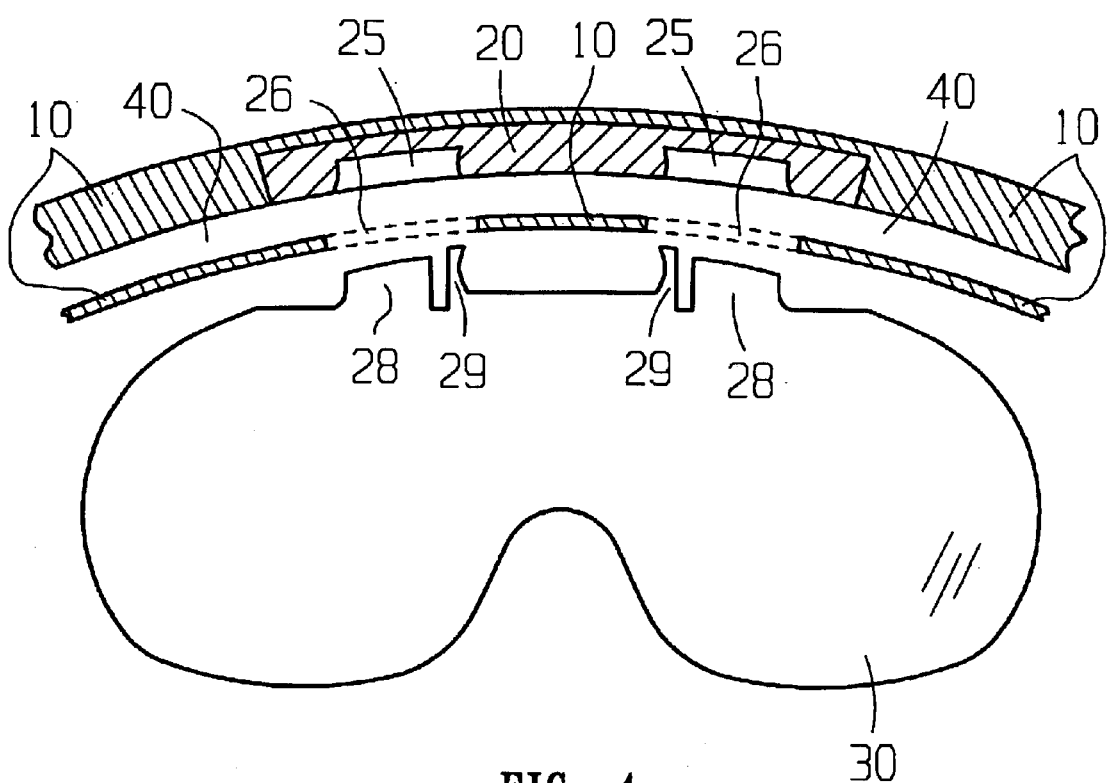
FIG. 4 is a sectional view of the visor portion showing the relationship between the pocket and connector means.

FIG. 4 details the attachment between the visor and the sunglasses. On the visor connector 20 two fabric openings 26 lead to two connector slots 25. Because the connector is hidden inside the pocket of the visor, the visor will be slightly thicker than an ordinary visor.

Two connector tabs 28 connector tab retainer 29 on the sunglasses slide and lock into these connector slots 25. The sunglasses are held in place by two connector tab retainers 29 which also slide through the two fabric openings 26 and into the two connector slots 26. The pocket 40 is between the connector 20 and the fabric opening 26. Although a pair of connector means is shown, more than a pair may be used. A plurality of connector slots match with a plurality of connector tabs such that each pair of connector slots and tabs mate with each other. The connector slots are built into the connected piece attached to the bottom side of the visor. The visor has a cloth covering on the underside that covers the connector. Preferably, only the openings in the fabric show the connector.

The sunglass material 30 is plastic and surface coated for UV protection. A wide variety of different tint and surface treatments provide a wide range of optical qualities. The plastic is semi-flexible allowing connection to the connector 20, while the planar surface is bent to conform to the connector slots 25. The sunglass material 30 being flexible also allows storage in a curved position inside the pocket 40.

A user while playing golf may experience a need for sunglasses. The user may remove visor and remove the sunglasses from the visor pocket. The user inserts the tabs of the sunglasses into the slots in the underside of the visor. When the user no longer needs the visor, the user may detach the sunglasses and stow the sunglasses in the visor pocket. The user may repeat the steps often because of the disconnect and reconnect means. The device may be washed in a washing machine.

The foregoing describes the preferred embodiments of the invention and modifications may be made without departing from the spirit and scope of the invention as set forth in the following claims.

CALL OUT LIST OF ELEMENTS

10 visor
15 cap
20 connector
25 connector slot
26 fabric opening
28 connector tab
29 connector tab retainer
30 sunglasses
40 pocket
45 pocket opening
50 strap

What is claimed is:

1. A visor sunglasses device comprising:

a cap member for wearing by a user;

a visor member, wherein a pocket is formed in the visor member, the visor having a rigid planar member covered by fabric;

a connector having a pair of connector slots, the connector rigidly affixed to the underside of the rigid planar member and hidden inside the pocket of the visor, the visor having a fabric opening allowing access of connector tabs to connectors slots;

a sunglass member, said sunglass member of semi flexible plastic material bending to conform to the bend of the visor from a neutral planar position when the sunglass member is stored in the pocket, and wherein the sunglass member bends from the neutral planar position when the sun glasses member is attached to the visor;

a pair of connector tabs integrally formed on the sunglass member, the pair of connector tabs disconnectably connecting to the pair of connector slots.

2. The visor sunglasses device of claim 1 wherein the sunglass member is tinted.

3. The visor sunglasses device of claim 1 wherein the sunglass member is treated for ultraviolet protection.

4. The visor sunglasses device of claim 1 wherein the sunglass member is shaped to have a profile accommodating a user's nose to prevent the sunglass member from touching the users face.

5. The visor sunglasses device of claim 1 wherein the visor and sunglasses connect via two pairs of connector slots and tabs.

6. The visor sunglasses device of claim 1 wherein the visor and sunglasses connect via three pairs of connector slots and tabs.

7. A visor sunglasses device comprising:

a visor having a strap for attachment to a person's head as head wear;

a connector member attached to the underside of the visor, the connector member having a plurality of slots;

a tinted sunglass member having an equal number of tabs as the plurality of slots; each respective tab and slot matedly connectible, wherein the equal number of labs are disconectable from the slots and matedly reconnectable with the slots;

a pocket formed in the visor for storage of the tinted sunglass member.

8. The visor sunglasses device of claim 7 wherein the sunglass member is tinted.

9. The visor sunglasses device of claim 7 wherein the sunglass member is treated for ultraviolet protection.

10. The visor sunglasses device of claim 7 wherein the sunglass member is shaped to have a profile accommodating a user's nose to prevent the sunglass member from touching the users face.

11. The visor sunglasses device of claim 7 wherein the visor and sunglasses connect via two pairs of connector slots and tabs.

12. The visor sunglasses device of claim 7 wherein the visor and sunglasses connect via three pairs of connector slots and tabs.

* * * * *